April 2, 1929.  G. S. HILTZ ET AL  1,707,521
PRINTING TELEGRAPH SYSTEM
Filed Aug. 3, 1926   6 Sheets-Sheet 1

Inventors
G. S. Hiltz
W. F. Purcell
By their Attorneys
Cooper, Kerr & Dunham

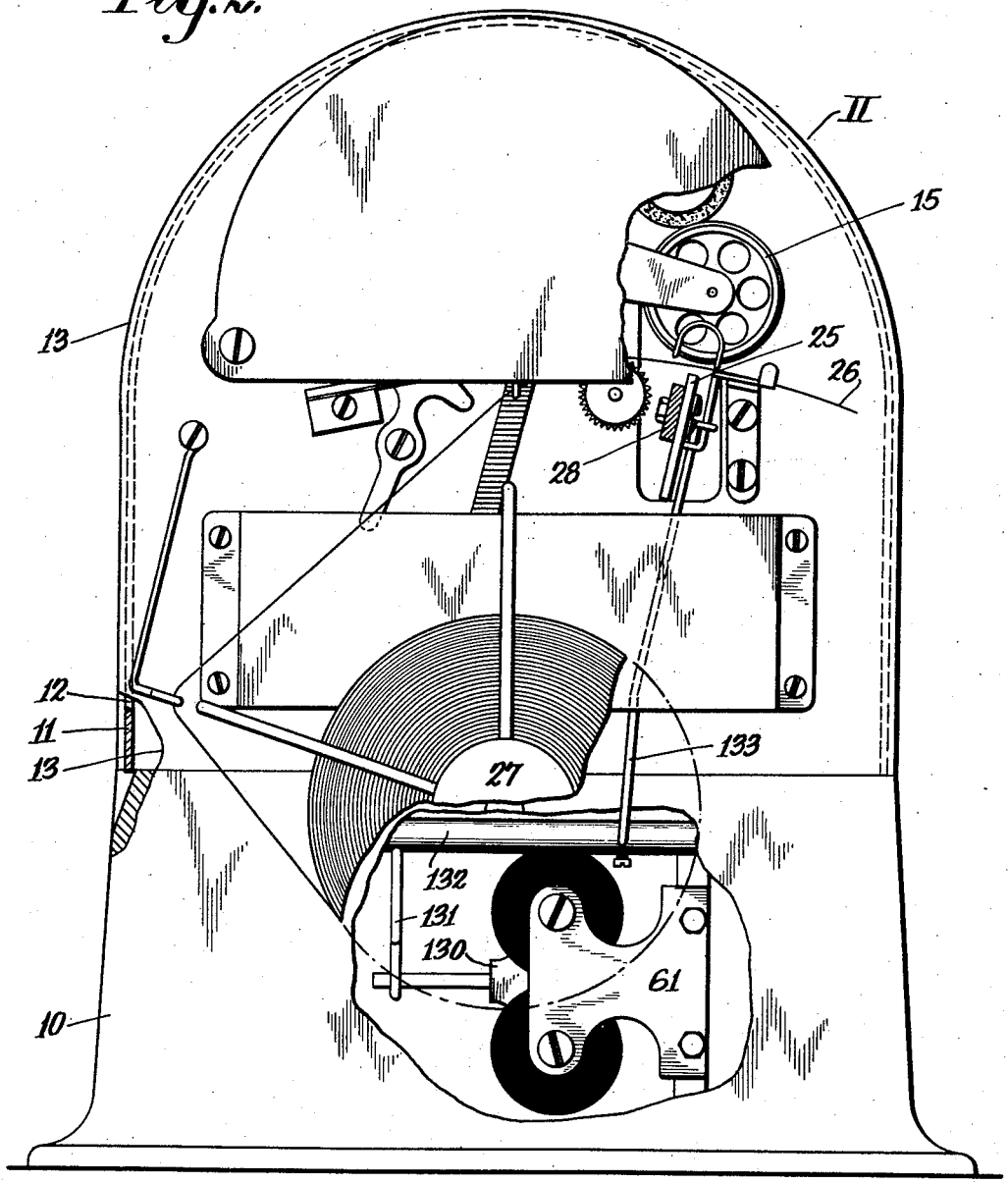

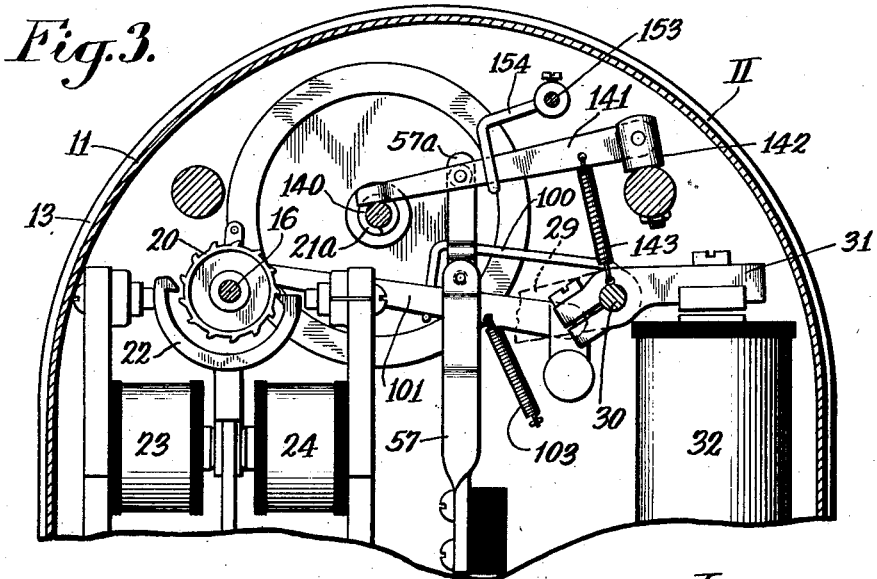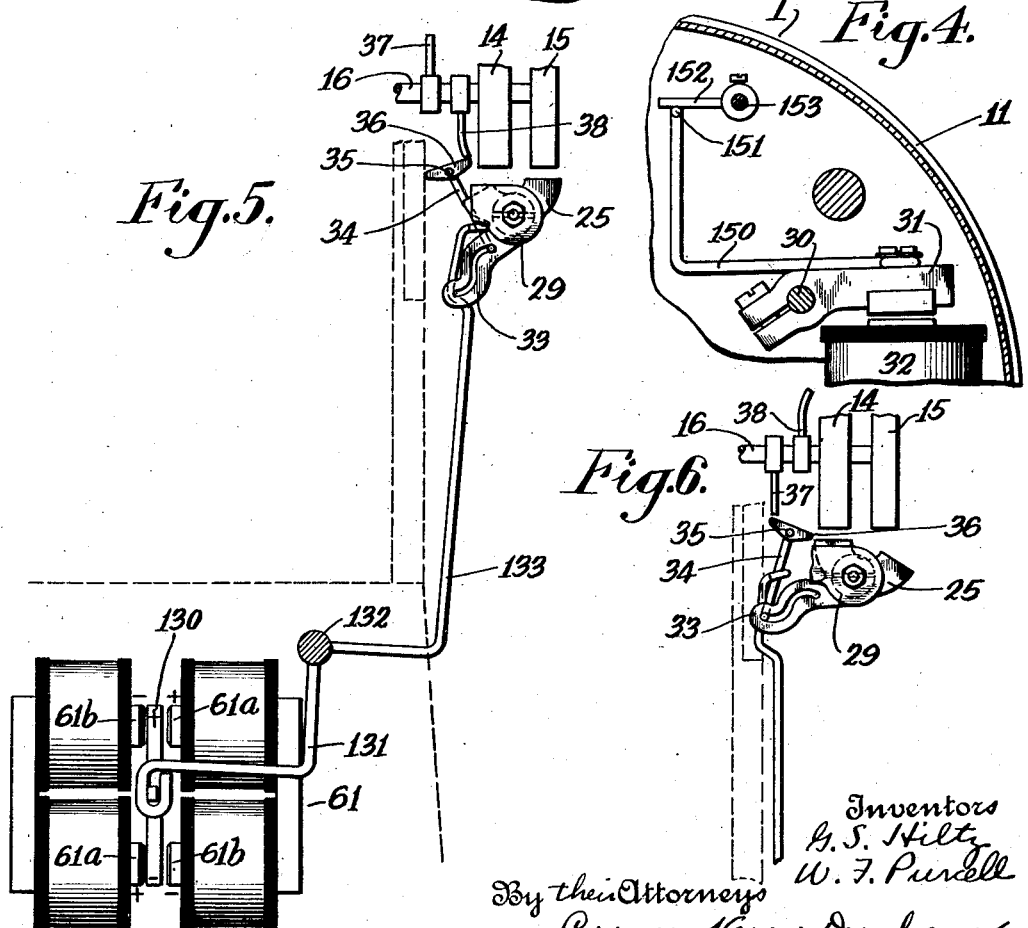

April 2, 1929.  G. S. HILTZ ET AL  1,707,521
PRINTING TELEGRAPH SYSTEM
Filed Aug. 3, 1926   6 Sheets-Sheet 4

Inventors
G. S. Hiltz
W. F. Purcell
By their Attorneys
Cooper, Kerr & Dunham

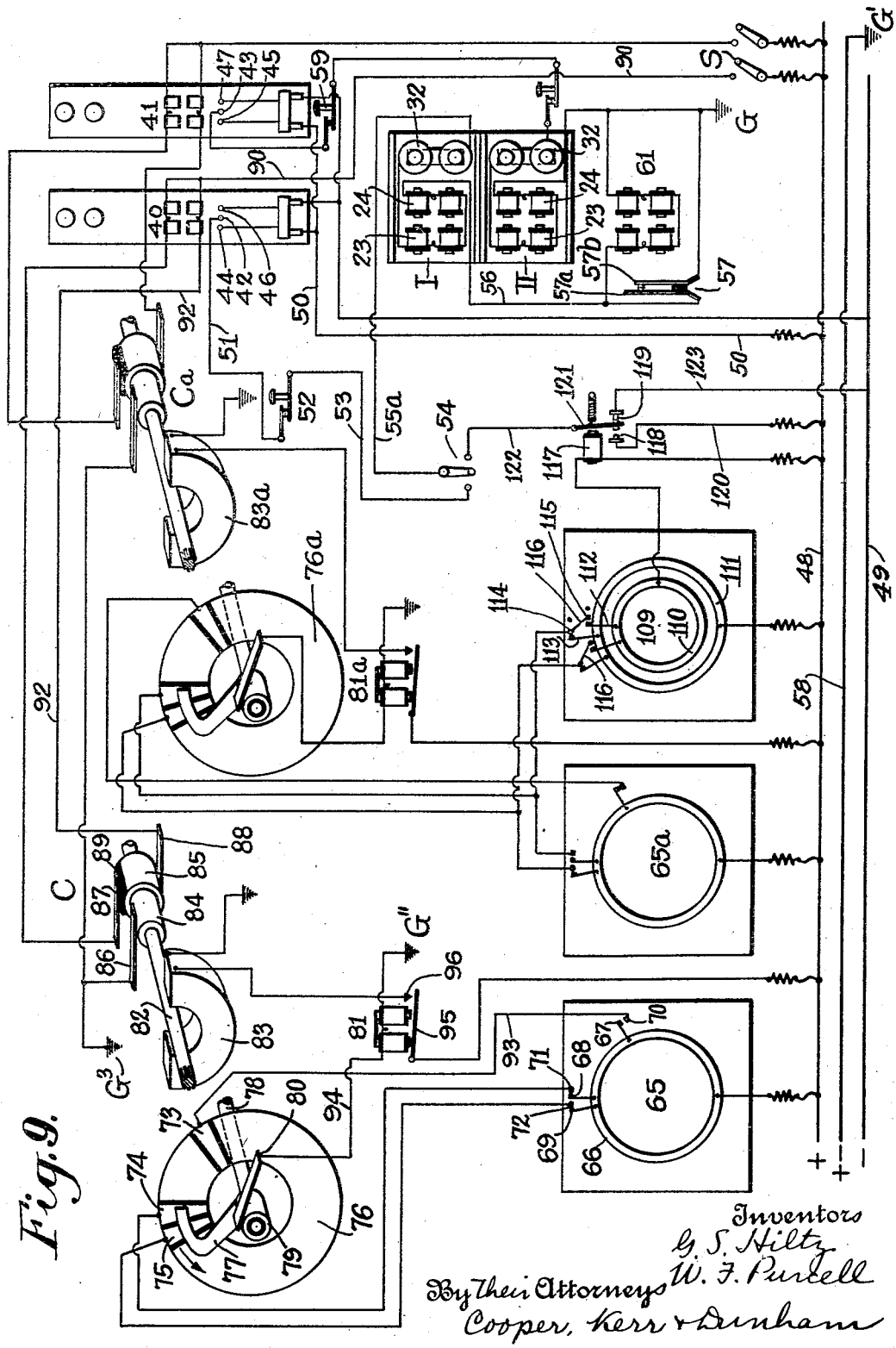

Patented Apr. 2, 1929.

1,707,521

UNITED STATES PATENT OFFICE.

GEORGE S. HILTZ, OF BROOKLYN, NEW YORK, AND WILLIAM F. PURCELL, OF HOBOKEN, NEW JERSEY, ASSIGNORS TO STOCK QUOTATION TELEGRAPH COMPANY, OF NEW YORK, N. Y., A CORPORATION OF NEW YORK.

PRINTING-TELEGRAPH SYSTEM.

Application filed August 3, 1926. Serial No. 126,774.

In the use of printing telegraph systems for reporting sales on the stock market and other markets it sometimes happens that the sales are so numerous and follow so rapidly that the "ticker" system cannot keep up. If the market is active it is not uncommon for the ticker to be thirty minutes or more behind, and on occasions it may drop back nearly an hour; this, too, at a time when it is especially important to have sales reported with the least possible loss of time, since it is in an active market that price changes are not only most rapid but also have the widest range.

We have accordingly been led to devise our present invention, which has for its chief object to provide a substantial increase in the speed of operation of ticker systems, without impairing the certainty and reliability of operation that such systems must have. A further object is to increase the speed of operation without unduly increasing the number of transmission circuits and the consequent cost of operation. To these and other ends the invention comprises the novel features and combinations hereinafter described.

In carrying out our invention in the preferred manner we employ a plurality of transmitters at the transmitting station and a plurality of receivers at one or more receiving stations, forming, in effect, a plurality of simultaneously operable systems each capable of operation without interference from any other. We also provide means whereby, at the will of the transmitting operator, one or all of the systems may be used, and we also provide means whereby when one or more are idle their transmission circuits may be effectively employed for increasing the speed of the system or systems actually in operation.

For example, suppose we have two transmitters and two tickers. If, then, we divide the stock list into two groups, and assign one group to one operator and the second group to the other, so that neither has to report more than, say, about half the total number of sales but sends only the transactions in his own group, it will, upon reflection, be seen that twice as many transactions can be reported in the same time as when one operator is reporting the entire list. This is equivalent to doubling the speed of a single transmitter. Similarly, with three simultaneously operable systems we can have virtually treble the speed of a single system. Ordinarily, however, the market is not active enough to require more than one. In other words, one set of transmitting and receiving apparatus can under ordinary circumstances keep up with the entire list, and hence under such conditions the cost of operating an additional set would not be warranted. On other occasions, the market may be too active for one operator to handle and yet not active enough to require double speed. At such times our invention makes effective use of the additional or extra equipment to enable one set to be operated at a substantial increase of speed.

Referring now to the accompanying drawings, in which the invention is illustrated as embodied in the preferred manner in apparatus of the "one wire" type:

Fig. 2 is a side view from the left of Fig. 1, with part of the enclosing casing broken away.

Fig. 3 is a detail section taken about on line 3—3 of Fig. 1.

Fig. 4 is a detail section on line 4—4 of Fig. 1.

Fig. 5 is a detail rear view, from the left of Fig. 2, of the two typewheels, the platen, and the platen-shifting mechanism.

Fig. 6 is a detail view from the same point of view as Fig. 5, showing the platen positioned to print from the left typewheel instead of the right wheel as in Fig. 5.

Fig. 9 is a wiring diagram of the complete apparatus.

Figure 1:
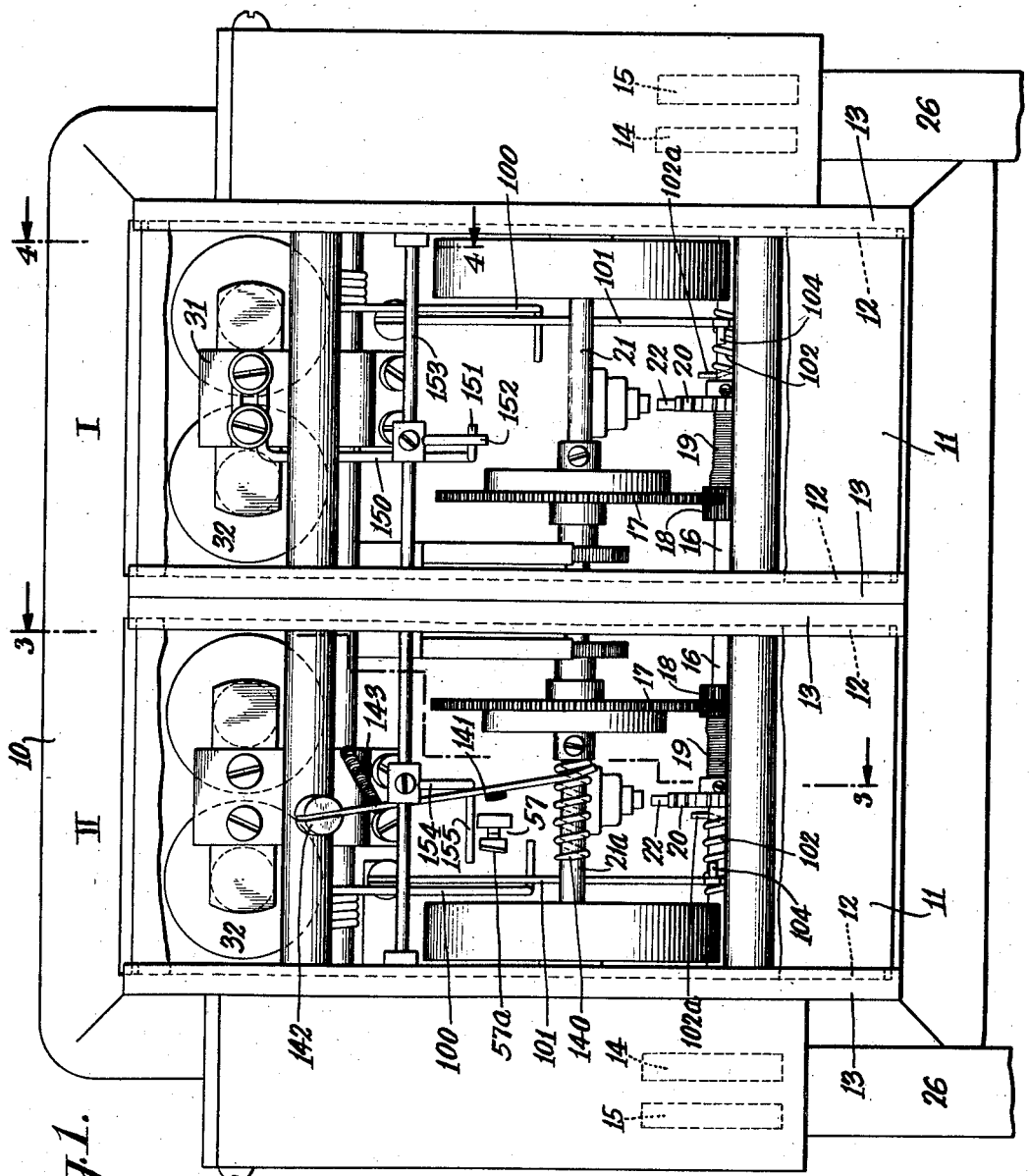
Fig. 1 is a plan view of the receiving instruments or tickers at a receiving station.

The receiving apparatus illustrated in Figs. 1 to 6 comprises two complete tape-printing receivers or "tickers" I, II, arranged side by side on the same base 10 and protected by arched covers 11 of flexible material slidably mounted in grooves 12 in the side plates 13. In construction and operation the tickers shown are mechanically and electrically like those illustrated in the prior patents of George S. Hiltz Nos. 1,085,124 and 1,558,610, to which reference may be made for a detailed description. Inasmuch as the specific construction of the tickers is not essential to an understanding of our present invention the following brief description will be sufficient.

The two tickers are each provided with two typewheels 14, 15, Figs. 1, 2, 5, 6, fixed on shafts 16 mounted for rotation in the side plates or frames 13 by the large gears 17 meshing with pinions 18. The latter are loose on the shafts but are yieldingly connected thereto by means of coil springs 19 encircling the shafts, one end of the springs being connected to the pinions and the other end to the hubs of the scape wheels 20. The driving gears 17 are mounted on the shafts 21, 21$^a$, and are rotated by coil springs (not shown) in the usual manner. The rotation of the typewheel shafts 16 by the gears 17 is step-by-step and is controlled by the scape wheels 20 and anchors 22, the latter being oscillated by polarized escapement magnets 23, 24, Fig. 3, so that when current impulses of alternating polarity are sent through the magnets named the scape wheels, and consequently the typewheels also, will be rotated step by step to bring the desired typewheel characters to the printing points, which are immediately above the platens. One of the platens is shown at 25, Figs. 5 and 6.

The tapes 26, Figs. 1 and 2, are drawn from reels or spools, as 27, Fig. 2, and are passed between the typewheels and platens by feed rollers actuated at each printing operation. One of the toothed feed rollers or wheels is shown at 28, Fig. 2.

The platen 25, Figs. 2, 5 and 6, is pivotally mounted on the end of an arm 29 fixed on the transverse shaft 30 on which is also fixed the armature 31 of the heavy printing or press magnet 32, so that when the latter magnet is energized (by a prolonged current impulse of either polarity) the platen will be thrown up and will press the tape against one type wheel or the other according to the pivotal adjustment of the platen, which, as shown in Figs. 5 and 6, is forked to provide two printing fingers, one for each typewheel. Thus, when the platen is in its counterclockwise position, Fig. 5, imprints will be made from type wheel 15. In its other position, Fig. 6, imprints will be made from wheel 14.

One typewheel, say 15, carries letters, and the other carries numerals, and hence it is necessary to shift the platen accordingly in the operation of the receiver. For this purpose the platen is provided with a finger 33 having a cam slot engaged by an L-shaped arm 34 pivoted on a center 35 and having an actuating cross bar 36, and on the typewheel shaft are two actuating fingers 37, 38, extending radially in the planes of the ends of said crossbar. Suppose now that the platen is in the position shown in Fig. 5 and that the next imprint should be from typewheel 14.

To make the "shift" the sending operator first transmits current impulses of the proper number to rotate the typewheel shaft 16 far enough to bring finger 38 (from wherever it happens to be) to the position shown in Fig. 5, in which the said finger is directly over the right end of the actuating bar 36. In this position a period or a blank space on typewheel 14 is at the printing point. Now when the press magnet 32 is energized the platen is raised, first causing the crossbar 36 to be rocked clockwise by the finger 38 and in turn rock the arm 34 in the same direction, which latter arm by its engagement with the cam slot in finger 33 swings the platen clockwise to the position shown in Fig. 6. Continuing its upward movement the platen carries the tape up against typewheel 14 and prints a period; or, if the wheel has no period at the "shift" point, a blank space is left on the tape. Thereafter, all imprints will be made from typewheel 14 unless the operator brings shift finger 37 to the position shown in Fig. 6. Then when the platen is raised the finger swings the platen counterclockwise, back to the position shown in Fig. 5, as will be readily understood.

Referring now to Fig. 9: The alternating current impulses by which the ticker escapements are controlled are sent over the two line circuits by two relays 40, 41 (shown in the upper right hand corner of the figure), whose armatures, represented by contacts 42, 43, play between contacts 44, 46, and 45, 47, and upon tracing the connections it will be seen that when a relay armature engages its left-hand stationary contact (44 or 45) an impulse of one polarity, e. g. positive, will be passed from main 48 through the ticker. Conversely, when the armature is on the right hand contact a negative impulse will be transmitted from main or bus 49. For instance, when armature 42 is on contact 44 current flows from positive bus 48 through wire 50, contact 44, armature 42, wire 51, repeat key 52, wire 53, switch 54 (in its leftward position), wire 55, press magnet 32 and escapement magnets 23—24 of ticker I, wire 56, and key 57 (normally closed), ground G and ground G' to the "third wire" or neutral bus 58. Similarly, when armature 42 is on contact 46, current flows in the opposite direction, from ground G, as will be readily understood. In like manner current flows through ticker II in one direction when armature 43 is on contact 45, and in the other direction when the armature is on contact 47; except that the circuit does not include switch 54. The purpose of keys 52, 57, 59 and 59$^a$, and magnets 61 will be explained hereinafter.

Each ticker is controlled by or actuated from its own transmitter, and accordingly two transmitters are shown in Fig. 9. These are illustrated diagrammatically, and being of a type well known in the art the following brief description thereof will suffice. The keyboard 65 comprises a conducting ring or circular bus 66 having normally open spring contacts (only three of which are shown, 67, 68, 69), actuated by finger keys, not shown, to engage corresponding fixed contacts 70, 71, 72, in series with the contacts 73, 74, 75 on "sunflower" 76 traversed by the revolving wiper 77 fixed on shaft 78 and having a slip ring 79 engaged by a brush 80 connected through the clutch relay 81 to ground G''. Shaft 78 is rotated (through gearing not shown) by shaft 82 which is connected through a friction clutch, not shown, to the constantly rotating armature shaft of a driving motor, not shown; the friction clutch permitting shaft 82 to be arrested without stopping the motor. Relay 81 controls the circuit of an electromagnetic clutch 83, which may be of the type described in the prior patent of John Burry, No. 540,420, issued June 4, 1895. On shaft 82 is a commutator C comprising electrically connected slip rings 84, 85, engaged by brushes 86, 87, 88. Ring 85 has an insulating segment 89 to raise brush 87 off the ring once in each revolution. Assume now that the wiper 77 is revolving (in the direction of the arrow) and that the operator desires to transmit the letter M, to which, for example, contacts 67, 70 correspond. Closing these contacts by depressing the finger key (not shown), the revolving commutator continues to send impulses to the pole-changing relay 40 as follows: When insulating segment 89 is under brush 87 current flows from bus 48, through line switch S (normally closed), wire 90, lower magnet or relay 40, wire 92, brush 88, rings 85—84, brush 86, to ground $G^3$. When, however, the insulating segment 89 is on brush 88, current flows from bus 48 through the upper magnet of relay 40 to brush 87 and thence through rings 85—84 and brush 86 to ground $G^3$. In this way the armature 42 of relay 40 is caused to vibrate between contacts 44—46, thereby sending alternating impulses through the magnets of ticker I, as previously explained. While this is going on, the wiper 77 is revolving from contact 74, passing sunflower contact 75 and the other contacts (not shown) between the latter and contact 73 without affecting the clutch relay 81; but when it reaches contact 73 it finds the circuit closed at contacts 67—70, whereupon current flows from bus 48 through rings 66, contacts 67—70, wire 93, contact 73, wiper 77, slip ring 79, brush 80, wire 94, and clutch relay 81 to ground G''. The relay then closes the circuit of clutch 83 through relay armature 95 and contact 96, which energizes the clutch and arrests the commutator shaft 82, so that current continues to flow through ticker I in the direction last sent. That is, the last impulse is prolonged, thereby energizing the slow-acting press magnet 32 of ticker I and causing the desired character to be printed. In like manner keyboard $65^a$, sunflower $76^a$, clutch relay $81^a$, clutch $83^a$, and commutator $C^a$ control ticker II.

It is not necessary, in order to print the same character two or more times in succession, to rotate or reset the type wheel between printing, as it will be seen that if the clutch circuit be held closed and merely the line circuit opened and closed the press magnet will be de-energized and then re-energized. For this purpose repeat keys 52, 59, are provided, one for each keyboard 65, $65^a$, in the line circuits to tickers I, II. These keys are normally closed, but when the operator, say the operator at keyboard 65, desires to repeat the character last printed he merely holds down that key on the keyboard and then strikes and releases the repeat key 52. The opening of this key breaks the line between wires 51 and 53 (Fig. 9), thereby de-energizing press magnet 32 of ticker I, which thereupon lets go its armature. Then when the press magnet is re-energized by the closing of the key the printing armature is again actuated. This opening and closing of the line does not, however, cause the type wheel to turn, even one step, since the polarity of the current over the line is not changed and hence the escapement anchor is not actuated.

It is to be understood that each ticker is kept in "unison" with its transmitter. For this purpose each ticker is provided with a unison mechanism, which may be of the common and well known construction shown in Figs. 1 and 3, comprising an arm 100 fixed on the press magnet armature shaft 30 and hooked under the universally pivoted unison arm 101, the free end of which is drawn downwardly into engagement with a screw thread 102 on the type wheel shaft 16 by a light spring 103 which also tends to draw the arm away from the scape wheel 20. The thread or worm 102 is conveniently made of thick wire wound helically around the shaft and suitably secured thereto with its inner end $102^a$ extending radially outward to form a stop. Every time the press magnet is energized to make an imprint the finger 100 raises the arm 101, whereupon the spring swings the arm to its initial position, and the ticker continues as before; but when the operator sees that his own ticker (in series with the distant tickers) is out of step with the transmitter he raises both hands from the keyboard. All the sunflower circuits are then open, permitting the sunflower trailer and the commutator to revolve uninterruptedly. Since the press magnet is not energized the unison arm 101 remains in engagement with the screw 102, and the latter carries the arm toward the scape wheel 20, eventually bringing the stud 104 into the path of the stop $102^a$. Then when the stop strikes the stud the typewheel shaft 16 is arrested with a predetermined character, say a period, or a blank space, on the typewheel at the printing position. The operator then depresses the corresponding key, so that when the wiper next reaches the corresponding contact segment on the sunflower the commutator is arrested and the press magnet is energized, whereupon the unison arm is raised out of engagement with the screw, the spring 103 swings the arm back to initial position, and the tickers and transmitter start again in unison.

It will be noted that in the system described above the "shift" from one type row to the other is effected by bringing the typewheels to a shift position and then energizing the press magnet. Sometimes the angle through which the typewheels must be turned to bring them to the shift position is small. At other times it is larger. The time thus consumed is in a sense wasted, and in effect slows up the transmission of useful letters and characters. On the other hand, shifting without turning the typewheels requires, in general, another wire or circuit between the transmitter and the ticker. In the present system, however, at least two wires are provided—one for each transmitter and its associated ticker when the two sets are in use—so that when one set is not in use its wire or circuit is available to control or actuate suitable shifting mechanism for the other set, as will now be described.

Figure 7:
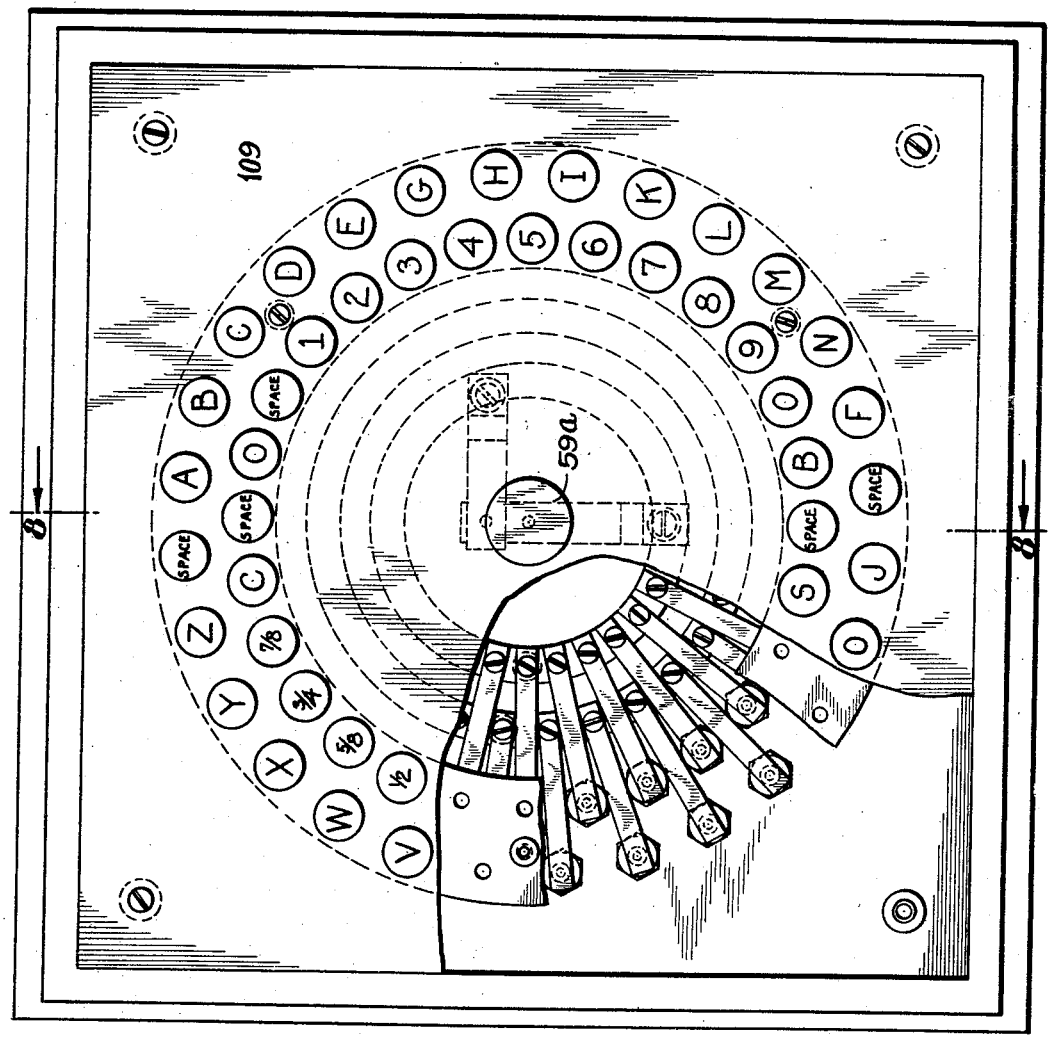
Fig. 7 is a plan view of a novel keyboard especially suitable for transmitting when only one of the sending and receiving sets is in use.
Figure 8:
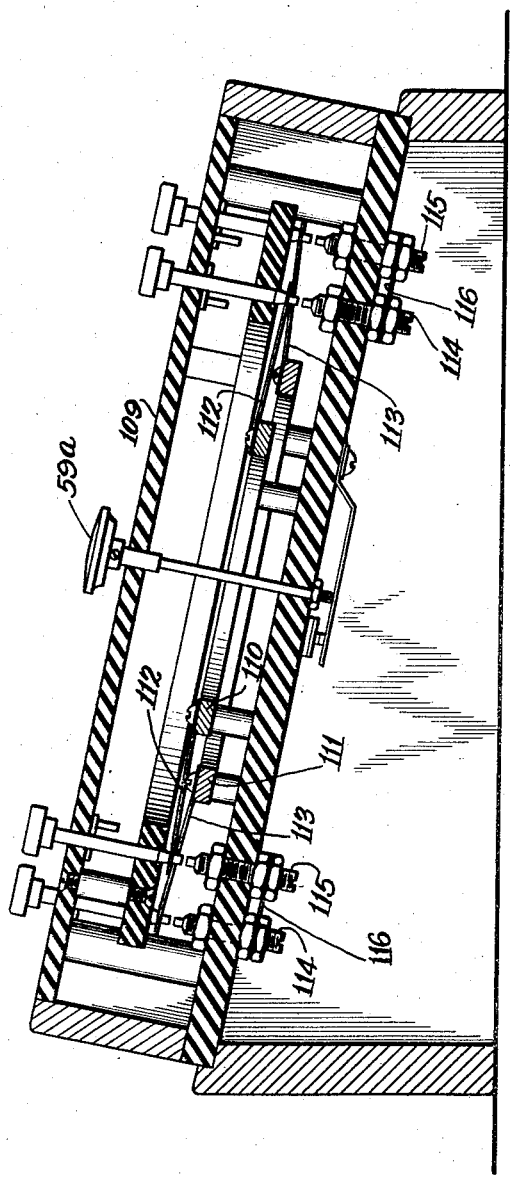
Fig. 8 is a cross section of the keyboard on line 8—8 of Fig. 7.

When only one of the transmitting and receiving sets is in operation we prefer to employ a special keyboard, 109, shown in Figs. 7 and 8. So far as its connection with sunflower 76$^a$ is concerned it is in parallel with keyboard 65$^a$, so that the associated transmitter can be operated from either keyboard. A repeat key 59$^a$ is provided, at keyboard 109, in series with repeat key 59 of keyboard 65$^a$. As shown in Figs. 7 and 8 the keyboard 109 comprises inner and outer bus rings 110, 111, carrying inner spring contacts 112 and outer spring contacts 113 underlying the respective finger keys A, B, C, . . . 1, 2, 3, . . . etc., by which they can be depressed into engagement with the underlying fixed contacts 114, 115, connected in pairs by means of jumper 116. All the characters in the outer ring or keys are on one type wheel of ticker II, for example wheel 15 of that ticker, and all in the inner ring are on the other wheel 14. Outer bus ring 111 is connected directly to the positive main 48 but inner ring 110 is connected to the same main through a relay magnet 117 whose armature plays between contacts 118, 119 and therefore acts as a pole-changing switch under the control of the keyboard to send current of positive polarity through wire 120, contact 118, relay armature 121, wire 122, switch 54 (thrown to its right hand position), wire 55$^a$, ticker I, and wire 56. Switch 57 having been previously opened, the current proceeds through the shift magnets 61 to ground G. Or the relay can send negative current from ground G through magnets 61, ticker I, wire 55$^a$, switch 54, wire 122, armature 121, contact 119, and wire 123 to the negative bus or main 49. It will therefore be seen that when a key in the inner ring of keys is depressed, thereby engaging an inner spring contact 112 with its lower fixed contact 115, the shift relay 117 will be energized, its armature will be drawn over to contact 118 (or will remain there if already in that position), and a positive impulse will be sent through shift magnets, giving one pair of the latter, say the right hand pair, a magnetization of opposite polarity to the magnetization of the other pair. But when a key in the outer ring is depressed no current flows through the shift relay 117, the armature is drawn over to contact 119 (or remains thereon), and a negative impulse of current is sent through the shift magnets 61, with corresponding effect on their magnetic polarity. It will also be seen that switch 54 cuts ticker I into and out of its line circuit and establishes a shift circuit under the control of relay 117; and that switch or key 57, when closed, lays a shunt across the shift magnets 61, thereby rendering them inoperative. When switch 57 is open current in the shift circuit flows through magnets 61 as described.

Referring now to Figs. 2 and 3, the shift magnets 61 have a polarized armature 130, pivoted at its forward end (not shown) and having its rear end extending into a loop on the lower end of an L-shaped finger 131 fixed on the rock shaft 132 having an arm 133 extending up to and loosely engaging the arm 34, which, as previously explained, rocks the platen 25 to "shift" from one typewheel to the other. Assuming that the armature 130 is polarized as indicated by the plus and minus signs thereon, and that a current of such polarity is sent through magnets 61 as will make poles 61$^a$ positive and poles 61$^b$ negative, as indicated by the signs in Fig. 5, the armature 130 is caused to swing to the left, as shown, thereby swinging shift arm 34 counterclockwise, which rocks the platen 25 in the same direction. On the other hand, if the direction of current flow through magnets 61 is reversed the poles 61$^a$, 61$^b$ are reversed and the armature 130 is swung to the right, thereby rocking the platen clockwise.

From what has been said hereinbefore it will be seen that in order to permit keyboard 109 to be used, with the magnetic shift mechanism, switch 54, Fig. 9, must be thrown to its rightward position, thereby cutting out ticker I and cutting in the shift circuit, and switch 57 must be opened. The former is done manually, and the latter is done by ticker II under the control of the operator by means now to be described.

Referring to Fig. 1, shaft 21$^a$ of ticker II is provided with a screw thread or worm 140, similar to the threads 102 on shafts 16, engaged by the free end of an arm 141 pivoted universally at 142 and urged downwardly and rightwardly by a spring 143. Inasmuch as shaft 21ª rotates clockwise (viewed from the left of Fig. 1) it will be seen that the worm 140 tends to carry the arm leftwardly. The longer member 57ª of switch 57 is of the spring type and extends into the path of the arm 141 as clearly shown in Figs. 1 and 2, so that if the arm is swung far enough by the worm the member 57ª will be bent away from the other, thereby cutting the shift magnets 61 into the shift circuit. This, however, is under the control of ticker I, in such manner that when ticker I is in use the opening of switch 57 is prevented automatically. For this purpose the press magnet armature 31 of ticker I, Figs. 1 and 4, is provided with an L-shaped arm 150 having a finger 151 bent laterally to underlie an arm 152 on a rock shaft 153 extending transversely of both machines, as clearly shown in Fig. 1, so that whenever the press magnet of ticker I is energized and its armature thereby actuated the shaft 153 will be rocked clockwise, Fig. 4. The shaft named also has an L-shaped arm 154 provided with a laterally extending finger 155 underlying the cut-out arm 141 (see Figs. 1 and 3), so that whenever the shaft is rocked as just described the arm 141 will be lifted out of engagement with the worm or screw 140, thus permitting the spring 143 to move to its rightward position, shown in Fig. 1. It will thus be seen that the operation of ticker II constantly tends to carry the arm into engagement with the switch member 57ª, but that the operation of ticker I prevents such engagement by lifting the arm at each printing operation. Upon reflection it will be understood that if only a few actuations of ticker II suffice to carry the arm over far enough to open the switch, the controlling operation of ticker I may sometimes not occur soon enough to prevent unintentional opening of the switch. To eliminate such possibility we prefer to locate switch 57 far enough from the rightward position of the arm, and so proportion the pitch of the worm 102, that it will require a considerable number of printing actuations of ticker II, for example twenty-five or thirty, to carry the arm far enough over to open the switch. With such leeway it is practically certain that ticker I will exercise its control in time to prevent opening the switch.

When it is desired to change from the multiple system to the single system with the automatic shift, the operator of system I leaves his keyboard and opens his line switch S, the other operator (working on keyboard 65ª) goes to keyboard 109, throws switch 54, and sends a sufficient number of repeat impulses to ticker II, by opening and closing repeat key 59ª, to cause arm 141 to open switch 57. Thereafter the shift from one type wheel to the other is effected automatically by the operation of the keyboard. To return to the multiple system, switch 54 is thrown to its leftward position, switch S is closed, and the operators go back to keyboards 65, 65ª. The first imprint by ticker I then closes switch 57.

It will be easily seen that when switch 54 is in its leftward position keyboard 109 will operate ticker II as a one-wire machine, as does keyboard 65ª. The latter is therefore unnecessary, but it is included, in the specific system described, to indicate the facility with which our invention can be applied to or embodied in existing systems.

It is to be understood that the invention is not limited to the specific construction herein described but can be embodied in other forms without departing from its spirit.

We claim:

1. In a printing telegraph system, in combination, a plurality of transmitters and receivers, transmission circuits individual to the transmitters and associated receivers, and means operable at will for cutting a receiver out of the system and utilizing its transmission circuit in the operation of another receiver of the system.

2. In a printing telegraph system, in combination, a plurality of one-wire transmitters and receivers, transmission circuits therefor, means operable at will to cut a receiver out of the system and throw its circuit over to another receiver, and means then operable for employing said circuit in the operation of said other receiver as a two-wire receiver.

3. In a printing telegraph receiver, in combination, a plurality of transmitters and receivers, transmission circuits individual thereto, means operable at will for cutting a receiver out of the system and throwing its transmission circuit into cooperation with another receiver, and means then operable for utilizing said circuit in the control of said other receiver, the last mentioned means including a keyboard associated with the appropriate transmitting apparatus and equipped for two-circuit transmission.

4. In a printing telegraph system, in combination, a plurality of one-wire transmitters and receivers, each receiver having a plurality of type-wheels and provided with typewheel-selecting means dependent for operation upon rotation of the typewheels to a shift position, type wheel-selecting means associated with one of the receivers and operable independently of the position of the typewheels, and means operable at will for utilizing the transmission circuit of another receiver to control the last-mentioned selecting means.

5. In a printing telegraph system, in combination, a receiver having a plurality of typewheels and provided with typewheel-selecting means dependent for operation upon rotating the typewheels to a predetermined position, typewheel-selecting means operable independently of the first mentioned means, and means for utilizing either selecting means at will.

6. In a printing telegraph system, in combination, a receiver having a plurality of typewheels and provided with typewheel-selecting means dependent for operation upon bringing the typewheels to a predetermined shift position, a transmission circuit for controlling all the operations of the receiver, typewheel-selecting means associated with said receiver and operable independently of the position of the typewheels, a second receiver, a transmission circuit for controlling the latter, and means for utilizing the second-mentioned circuit to control the second-mentioned selecting means or the first receiver, at will.

7. In a printing telegraph system, in combination, a receiver having a plurality of type wheels, electromagnetic type wheel selecting means to shift from one type wheel to another in printing and dependent for operation upon change of current polarity and independent of the position of the type wheels, a transmitting keyboard having means for automatically changing the current polarity according to the character to be printed, a type wheel positioning circuit, a type wheel selecting circuit associated with the said receiver and the aforesaid keyboard, and a second receiver also having a plurality of type wheels and having type wheel selecting means dependent for operation upon a predetermined position of the type wheels, and means operable at will for disconnecting the type wheel selecting circuit for the first mentioned receiver and associating it with the second mentioned receiver to control the latter.

8. In a printing telegraph system, in combination, a receiver having a plurality of typewheels and having typewheel-selecting means operable when the typewheels are brought to a predetermined position, said receiver also having electromagnetic type-wheel-selecting means operable independently of the first, a keyboard associated with the receiver to control the same and the first typewheel-selecting means, and a keyboard associated with the receiver to control the same and to control the second typewheel-selecting means according to the character to be printed.

9. In a printing telegraph system, in combination, a plurality of receivers each having a plurality of typewheels and having typewheel-selecting means operable when the typewheels are brought to a predetermined position, electromagnetic typewheel-selecting means associated with one of the receivers, and means under the joint control of the latter receiver and another receiver of the system to permit the use of either typewheel selecting means at will.

10. In a printing telegraph system, in combination, a receiver having a plurality of typewheels and having typewheel-selecting means operable when the typewheels are in a predetermined position, electromagnetic typewheel-selecting means for said receiver operable independently of the first means, a transmission circuit for the receiver and said first typewheel-selecting means, a second receiver, a transmission circuit therefor, means enabling the transmission circuit of the second receiver to be associated with the second typewheel-selecting means of the first receiver to control the same, and automatic means preventing the operation of said enabling means while the second receiver is operating.

11. In a printing telegraph system, in combination, a receiver having a plurality of typewheels and typewheel-selecting means operable when the typewheels are brought to a predetermined position, electromagnetic typewheel-selecting means for said receiver operable independently of the first means, a second receiver, a transmission circuit therefor, means associated with the first receiver to cut the electromagnetic means into the transmission circuit of the second receiver, and means actuated by the second receiver to keep said electromagnetic means out of its circuit.

12. In a printing telegraph system, in combination, a receiver having a plurality of typewheels and typewheel-selecting means operable when the typewheels are in a predetermined position, a second receiver and a transmission circuit therefor, electromagnetic typewheel-selecting means for the first receiver but connected in the transmission circuit of the second, a shunt normally across said electromagnetic means to prevent operation thereof, and means under the joint control of said receivers to open the shunt at will.

13. In a printing telegraph system, in combination, a receiver having a plurality of typewheels, electromagnetic typewheel-selecting means controlled by change of current polarity, a keyboard having groups of keys individual to the receiver typewheels, and a pole-changing relay associated with the keyboard and the receiver to determine the polarity of current through the typewheel-selecting means in accordance with the grouping of the keys.

14. In a printing telegraph system, in combination, a keyboard having a plurality of groups of keys each connected with a source of current, a pole-changing relay in circuit with one group of keys for energization when any key of such group is actuated, a receiver having a plurality of typewheels and having electromagnetic typewheel-selecting means, and a circuit therefor, controlled by said relay whereby current of one polarity will be passed through the circuit when a key of one group is actuated, and current of the other polarity when a key of another group is actuated.

15. In a printing telegraph system, in combination, a transmission circuit, a keyboard having a plurality of groups of keys each connected to a source of current, a receiver having a plurality of typewheels, a typewheel-selecting circuit therefor, typewheel-selecting means for selecting the typewheels singly according to the polarity of current in said circuit, means controlled by said groups of keys to send positive current over said circuit when a key of one group is actuated and negative current when a key of another group is actuated, a second receiver, having a plurality of typewheels and having typewheel-selecting means operable when the typewheels are in a predetermined position, a keyboard therefor, and means for using said typewheel-selecting circuit of the first receiver with the second mentioned key board as a transmission circuit for the second receiver.

16. In a printing telegraph system, in combination, a receiver having a plurality of typewheels, typewheel-selecting means operable when the typewheels are in a predetermined position; a transmission circuit for said receiver, typewheel selecting means for said receiver operable at any position of the typewheels, a controlling circuit for the second-mentioned selecting means, a keyboard associated with the transmission circuit and having a plurality of groups of connected keys, means associated with the keyboard and with said controlling circuit whereby actuation of a key automatically causes selection of a typewheel according to the groups in which the key is connected, a second receiver having a plurality of typewheels and having typewheel-selecting means operable when the typewheels are in a predetermined position, a keyboard for the second receiver, and operable at will to utilize the controlling circuit of the first receiver as a transmission circuit between the second receiver and its keyboard, whereby the receivers may be operated independently of each other on single circuits.

17. In a printing telegraph system, in combination, a plurality of one-wire receivers each having a plurality of typewheels and each having typewheel-selecting means operable when the typewheels are in a predetermined position; transmission circuits for the receivers, one for each; keyboards for the receivers; typewheel-selecting means for one of the receivers, operable independently of the position of the typewheels; means associated with the appropriate keyboard for controlling the second-mentioned typewheel-selecting means; and means operable at will to disconnect the transmission circuit of another receiver from its keyboard and connect said circuit with said controlling means for use with the second-mentioned typewheel-selecting means.

18. In a printing telegraph system, in combination, a plurality of one-wire receivers each having a plurality of typewheels, typewheel-selecting means operable when the typewheels are in a predetermined position, and a transmission circuit; one of said receivers also having electromagnetic typewheel-selecting means operable at any position of the typewheels upon change of current polarity; keyboards for the receivers; and means for utilizing the transmission circuit of another receiver to control said electromagnetic typewheel-selecting means from the appropriate keyboard.

In testimony whereof we hereto affix our signatures.

GEORGE S. HILTZ.
WILLIAM F. PURCELL.